Jan. 27, 1959   E. O. LAWRENCE   2,871,364
CALUTRONS
Filed March 28, 1946   6 Sheets-Sheet 1

INVENTOR.
ERNEST O. LAWRENCE
BY
ATTORNEY.

Jan. 27, 1959  E. O. LAWRENCE  2,871,364
CALUTRONS
Filed March 28, 1946  6 Sheets-Sheet 2
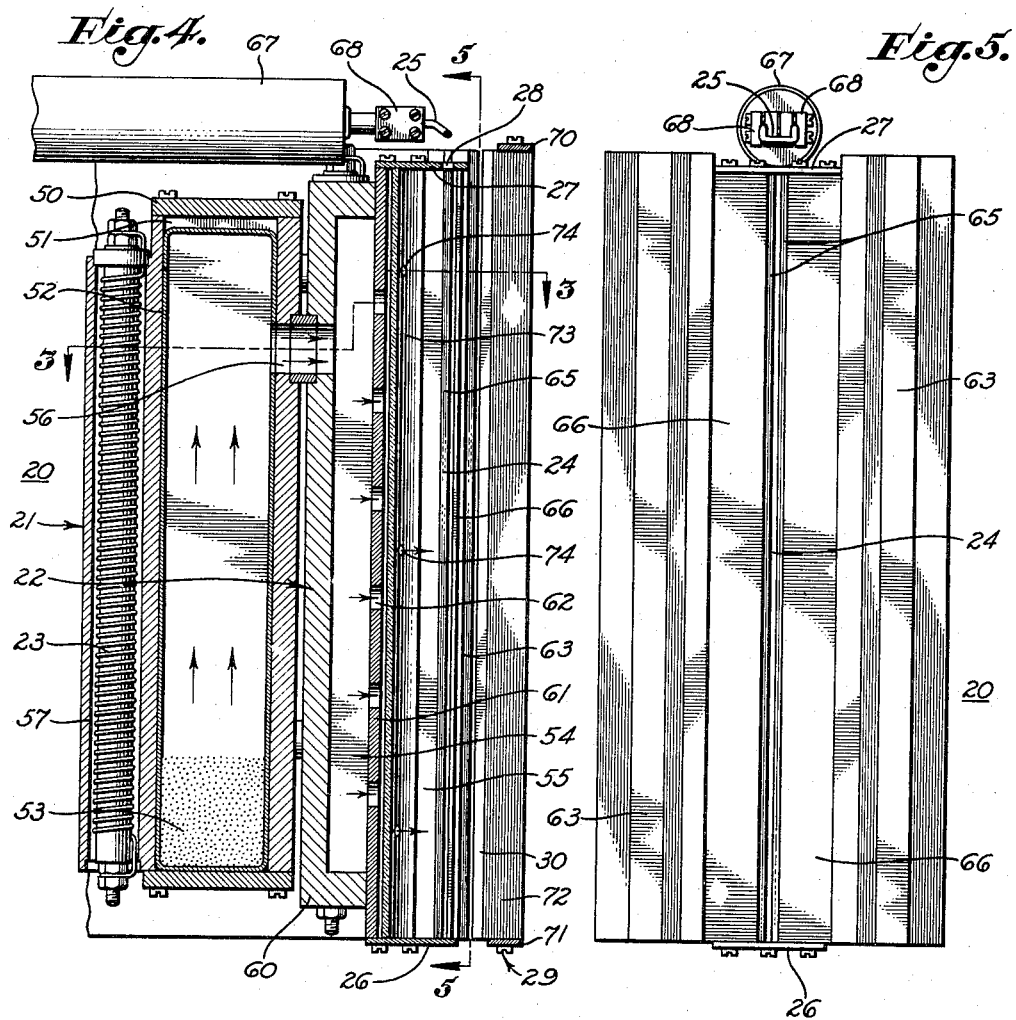
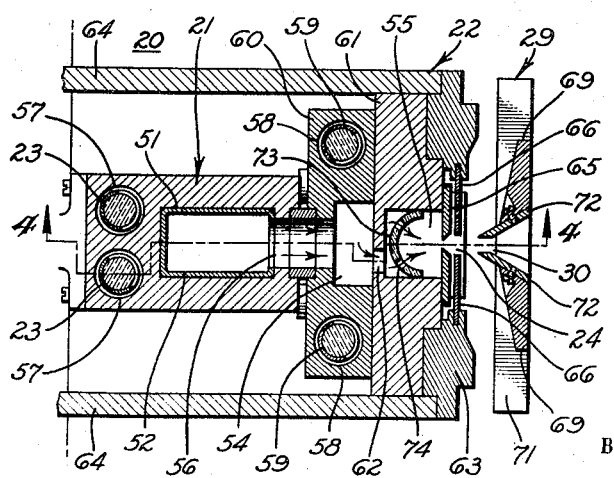
INVENTOR.
ERNEST O. LAWRENCE
BY
ATTORNEY.

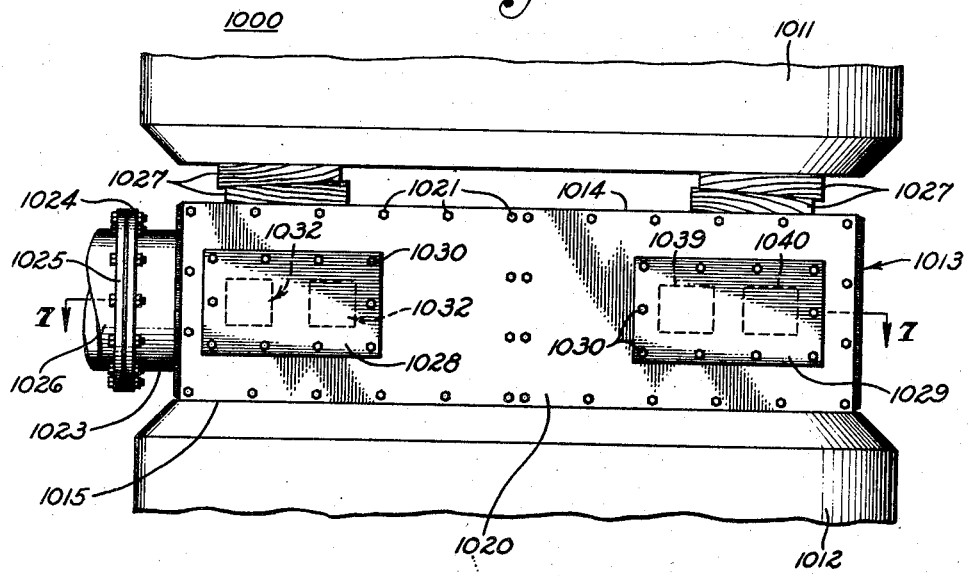
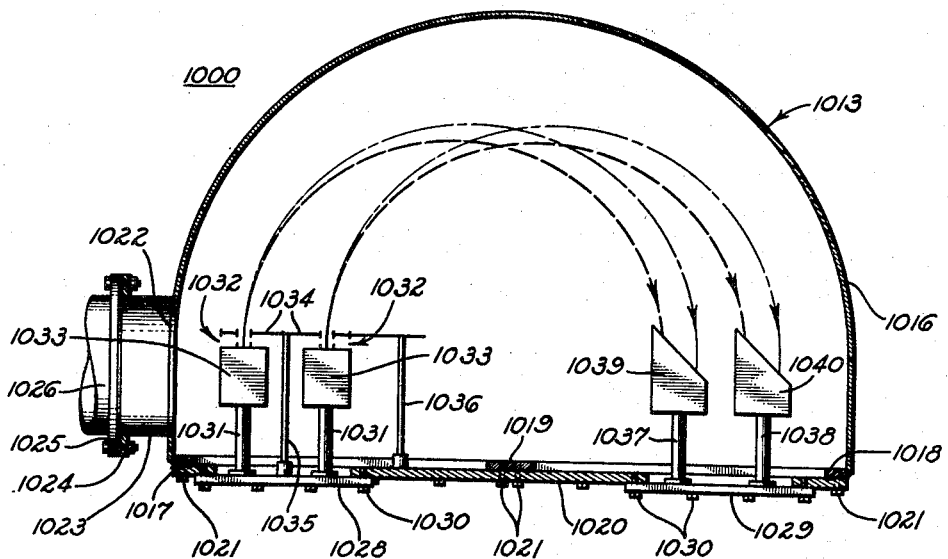

INVENTOR.
ERNEST O. LAWRENCE
ATTORNEY.

Jan. 27, 1959 E. O. LAWRENCE 2,871,364
CALUTRONS
Filed March 28, 1946 6 Sheets-Sheet 5
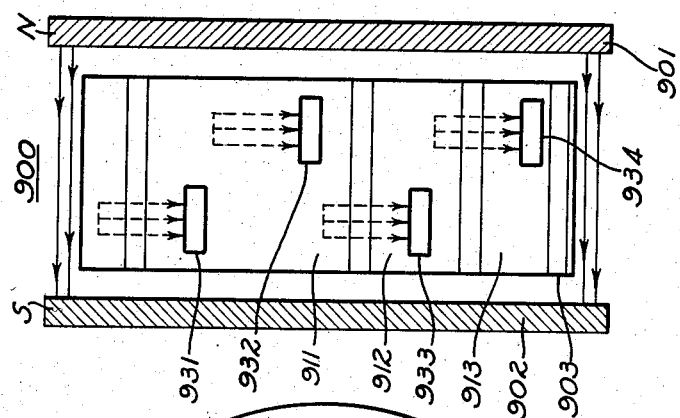
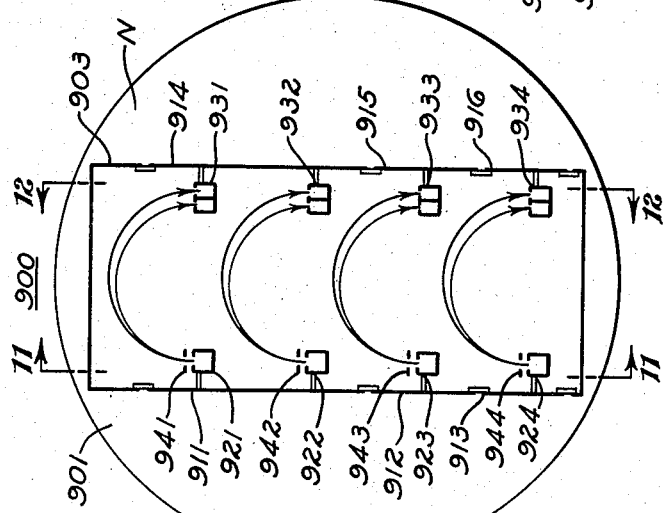
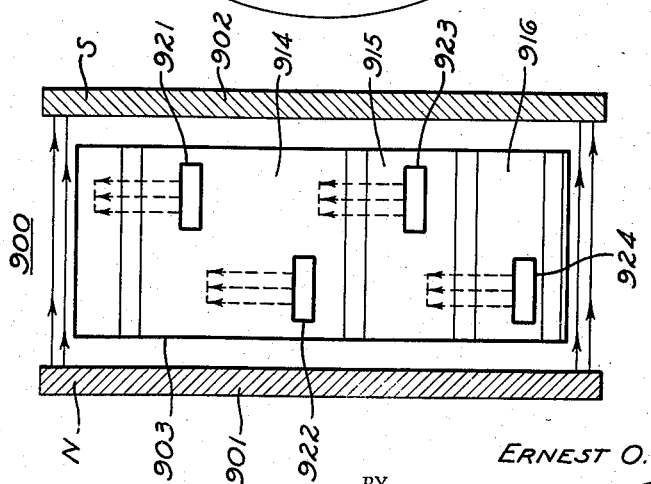
INVENTOR.
ERNEST O. LAWRENCE
BY
ATTORNEY.

Jan. 27, 1959     E. O. LAWRENCE     2,871,364
CALUTRONS
Filed March 28, 1946     6 Sheets-Sheet 6
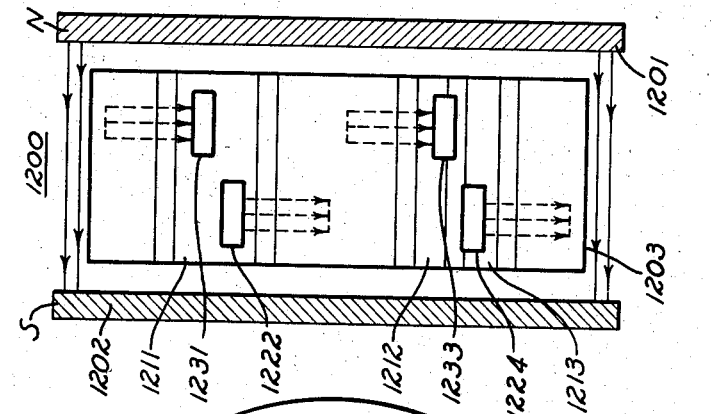
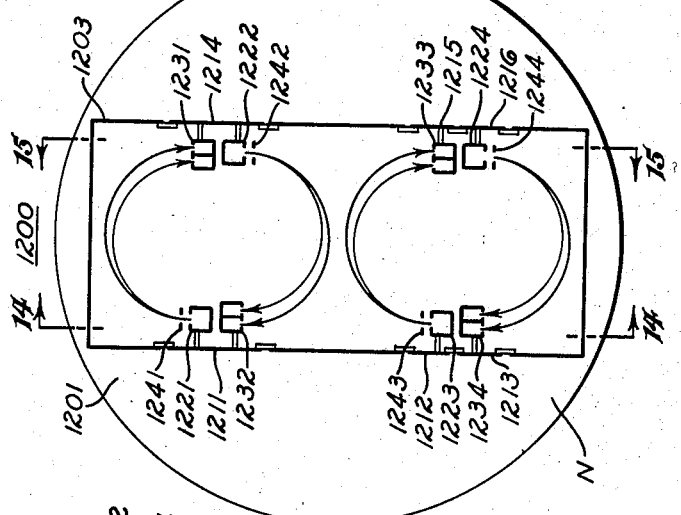
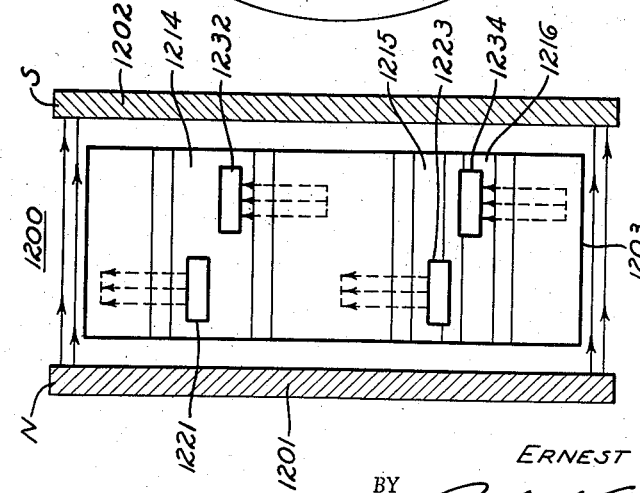
INVENTOR.
ERNEST O. LAWRENCE
BY
ATTORNEY.

United States Patent Office 2,871,364
Patented Jan. 27, 1959

2,871,364

CALUTRONS

Ernest O. Lawrence, Berkeley, Calif., assignor to the United States of America as represented by the United States Atomic Energy Commission Application March 28, 1946, Serial No. 657,638

8 Claims. (Cl. 250—41.9)

The present invention relates to the art of treating a polyisotopic substance to produce a plurality of segregable masses wherein the distribution of the constituent isotopes has been altered so that one of the masses produced is enriched with respect to at least one isotope. The purpose of such treatment is to obtain a product characterized by an enhancement of the percentage of a selected isotope. More specifically, the invention relates to a device known in the art as a "calutron," a term whose definition is "any apparatus or machine where isotope separation or enrichment is achieved on a large scale yielding commercially useful quantities of one or more isotopes, by appropriate separative action on gaseous ions with electrostatic or electromagnetic means or combinations of them."

The foregoing definition has been taken from my application for Letters Patent of the United States, Serial No. 557,784, filed on October 9, 1944, and which issued May 24, 1955 as Patent No. 2,709,222. In that patent, the theory of isotopic separation and the principles of operation of a calutron are fully set forth, and will not here be repeated.

It may be stated generally, however, that the calutron to which this invention relates comprises essentially an evacuated tank disposed in a strong, substantially uniform magnetic field, an ion beam transmitter and a receiver located within the tank.

The transmitter includes an ionizing arc chamber having an electron emitting cathode associated therewith. The arc chamber has an exit slit opening out into the tank, and spaced from the slit are two mutually spaced accelerating electrodes carried at a relatively high negative potential with respect to the arc chamber. As a result of this potential difference, positive ions formed in the arc chamber are drawn out through the slit, and are projected in a slightly divergent beam into the tank.

A continuous supply of material, the isotopes of which are to be separated, is provided in the arc chamber. This may conveniently be accomplished by providing a charge reservoir in communication with the arc chamber, and the material or a suitable compound thereof may be provided in the charge reservoir. The charge material may then be heated, and its vapor caused to flow at a controlled rate into the arc chamber, where ions of the several isotopes are formed and projected into the beam previously described.

The calutron described herein is particularly useful in the separation of $U^{235}$ and $U^{238}$, and a suitable charge material for this separation is $UCl_4$, a solid which may be caused to pass into the vapor phase by heating the compound in the charge reservoir. Alternatively, of course, the charge material may be a compound which is a gas at normal conditions and is supplied directly to the arc chamber at a controlled rate.

The beam of positive ions of the polyisotopic substance is projected through the magnetic field in a direction normal to the field, and the beam is caused thereby to follow an arcuate path wherein the ions of the heavier isotope tend to concentrate in the region adjacent the outer periphery. From geometric considerations there results a substantial focusing of ions of the same isotope after approximately 180° of travel, and selective collection of isotopes may be made at this location.

The present application is a continuation in part of my copending application for Letters Patent of the United States, Serial No. 536,401, filed May 19, 1944, and which issued as Patent No. 2,714,664, August 2, 1955. The invention which constitutes the subject matter of this patent relates particularly to the provision of suitable supporting and orienting means for the principal operative members of a calutron to the end that proper relative positions may be accurately maintained while still facilitating servicing, charging, cleaning, and maintenance of the units.

As will be apparent to anyone skilled in the art, the ion source and transmitting system and the receiver or ion collecting units of a calutron are in practice delicate and complex mechanisms, and any maladjustment or failure in either of these elements results in a correlative failure of the entire calutron unit to carry out its intended function.

Perhaps the most critical adjustment to be preserved in a calutron is the relationship between the ion transmitter and the ion collector or receiver units, which must be maintained with their collecting orifices located exactly at the region of sharpest focus of the ion beam if the desired enhancement of the collected samples with respect to a given isotope is to be secured. However, these same elements are the elements of the calutron which require the most frequent handling for the purposes of charging the source unit, removing the collected samples from the receiver units, cleaning or replacing the source slit members or the accelerating electrodes, etc.

These problems have been eccentuated by the progress of the art to calutrons employing a plurality of transmitter units arranged to transmit a corresponding plurality of ion beams to a plurality of receiver units in order to increase the capacity of the units and also to increase the degree of efficiency in the use of the available evacuated tank space.

Accordingly, it is one object of this invention to provide means of mounting and supporting the transmitter units and the collector or receiver units of a calutron so as to enable them to be quickly and accurately aligned and yet to provide for easy access to these units for servicing.

It is a further object of this invention to provide such mounting and supporting means which will permit the removal from the tank of an entire transmitter-receiver unit without disrupting the relative adjustment of the component mechanisms.

It is a further object of this invention to provide such mounting and supporting means which will also permit the removal from a tank of an individual source unit without disrupting the alignment within the tank of its associated receiver unit.

It is another object of this invention to provide such mounting and supporting means which will also permit the removal from the tank of an individual receiver unit without disrupting the alignment within the tank of its associated transmitter unit.

It is a further object of this invention to provide a calutron unit comprising a plurality of transmitter units arranged to transmit a corresponding plurality of ion beams to a correlative plurality of receiver units with said plurality of transmitter units and said plurality of receiver units each being mounted for separate removal from the tank and alternatively for joint removal from said tank, whereby either unit may be removed without disrupting the other unit, or whereby the entire assembly may be removed as a unit without disrupting the respective alignment of the elements.

A further object of the invention is to provide a calutron comprising a tank including removable structure supporting a plurality of transmitters arranged to transmit a corresponding plurality of ion beams in the evacuated tank space, whereby the structure supports two or more of the transmitters and is removable from the tank together with the supported transmitters as a unit.

A further object of the invention is to provide a calutron comprising a tank including removable structure supporting a plurality of receivers, and a plurality of transmitters arranged to transmit a corresponding plurality of ion beams through the evacuated tank space to the receivers, whereby the structure supports two or more receivers and is removable from the tank together with the supported receivers as a unit.

A still further object of the invention is to provide a calutron comprising a tank including removable structure supporting a plurality of receivers as well as a plurality of transmitters, the transmitters being arranged to transmit a corresponding plurality of ion beams through the evacuated tank space to the receivers, whereby the structure supports at least one transmitter and at least one receiver and is removable from the tank together with the supported transmitter and receiver as a unit.

Further objects and advantages appear hereinafter in the annexed specification, in which:

Fig. 3 is a transverse sectional view of an ion transmitter unit incorporated in the calutron, taken along the line 3—3 in Fig. 4;

Fig. 4 is a longitudinal sectional view of the ion transmitter unit taken along the line 4—4 in Fig. 3;

Fig. 5 is a front elevational view of the ion transmitter unit shown in Figs. 3 and 4;

Fig. 6 is a fragmentary front elevation of a calutron embodying the present invention;

Fig. 7 is a diagrammatic sectional view taken along the line 7—7 in Fig. 6;

Fig. 10 is a diagrammatic illustration of another form of calutron embodying features of the present invention and in which the ion beams are arranged in nonintersecting relation in upper and lower planes;

Figs. 11 and 12 are diagrammatic sectional views taken along the lines 11—11 and 12—12 of Fig. 10, respectively;

Fig. 13 is a diagrammatic illustration of another form of calutron embodying features of the present invention and in which the ion beams are arranged in nonintersecting relation in upper and lower planes; and Figs. 14 and 15 are diagrammatic sectional views taken along the lines 14—14 and 15—15 in Fig. 13, respectively.

Figure 1:
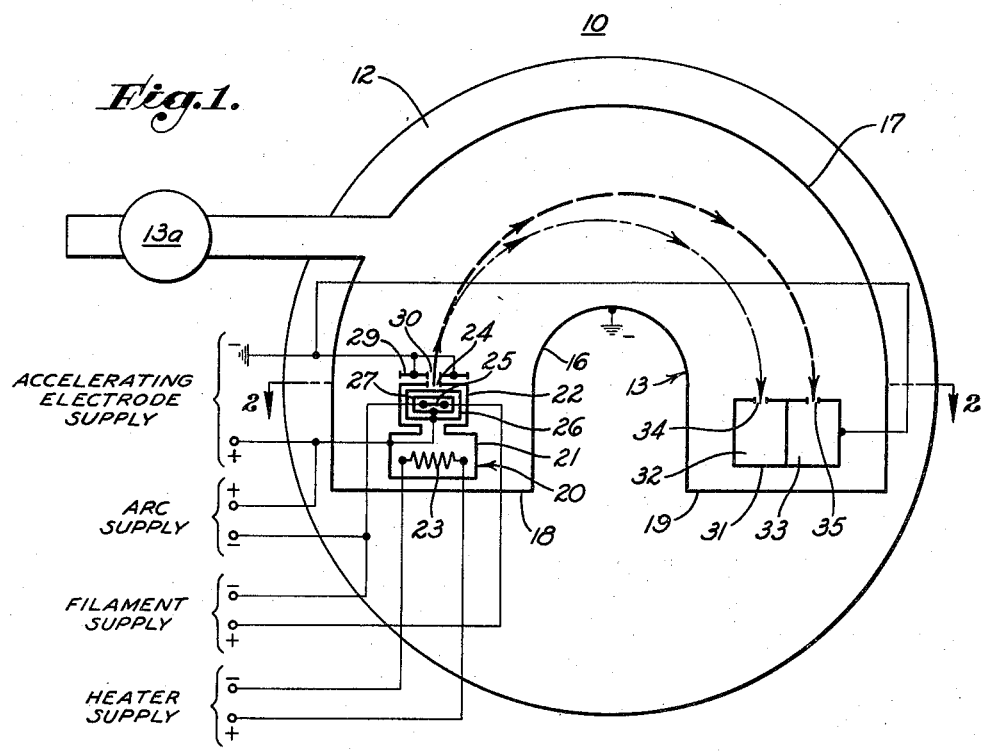
Figure 1 is a diagrammatic plan view of a representative calutron.
Figure 2:
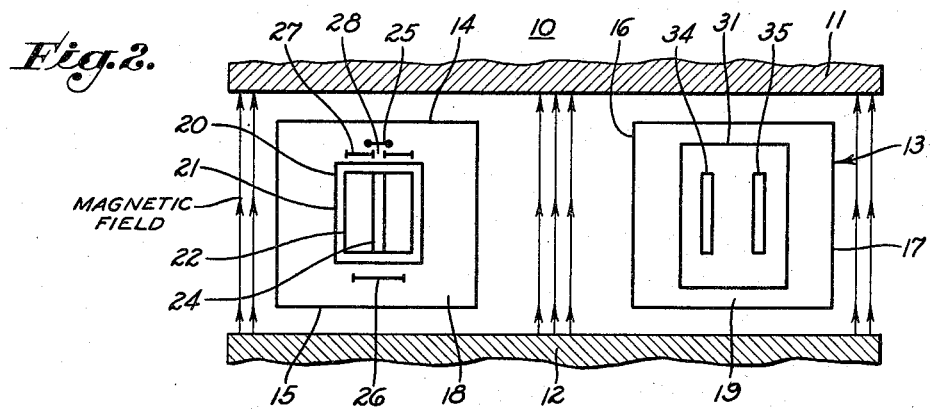
Fig. 2 is a diagrammatic sectional view of the calutron taken along the line 2—2 of Fig. 1.

Referring now more particularly to Figs. 1 and 2 of the drawings, there is illustrated a representative calutron 10 of the character noted, that comprises magnetic field structure including upper and lower pole pieces 11 and 12, provided with substantially parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer side walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus 13a is associated with the tank 13, whereby the interior of the tank 13 may be evacuated to a pressure of the order of $10^{-5}$ to $10^{-4}$ mm. Hg. Preferably, the component parts of the tank 13 are formed of steel, the top and bottom walls 14 and 15 thereof being spaced a short distance from the pole faces of the upper and lower pole pieces 11 and 12 respectively, the tank 13 being retained in such position in any suitable manner, whereby the top and bottom walls 14 and 15 constitute in effect pole pieces with respect to the interior of the tank 13, as explained more fully hereinafter.

The removable end wall 18 suitably supports an ion transmitter unit 20 comprising a charge receptacle 21 and a communicating arc block 22. An electric heater 23 is arranged in heat exchange relation with the charge receptacle 21 and is adapted to be connected to a suitable source of heater supply, whereby the charge receptacle 21 may be appropriately heated, the charge receptacle 21 being formed of steel or the like. The arc block 22 is formed, at least partially, of brass or the like and is substantially C-shaped in plan, an upstanding slot 24 being formed in the wall thereof remote from the charge receptacle 21. Thus, the arc block 22 is of hollow construction, the cavity therein communicating with the interior of the charge receptacle 21.

Also, the removable end wall 18 carries a filamentary cathode 25 adapted to be connected to a suitable source of filament supply, the filamentary cathode 25 overhanging the upper end of the arc block 22 and arranged in alignment with respect to the upper end of the cavity formed therein. The arc block 22 carries an anode 26 disposed adjacent the lower end thereof and arranged in alignment with respect to the cavity formed therein. Also, the arc block 22 carries a collimating electrode 27 disposed adjacent the upper end thereof and having an elongated collimating slot 28 formed therethrough and arranged in alignment with respect to the filamentary cathode 25 as well as the anode 26 and the cavity formed in the arc block 22. Both the anode 26 and the collimating electrode 27 are electrically connected to the arc block 22, which in turn is connected to the positive terminal of a suitable source of accelerating electrode supply, as explained more fully hereinafter. On the other hand, the tank 13 is grounded. Also, the filamentary cathode 25 and the cooperating anode 26 are adapted to be connected to a suitable source of arc supply.

Further, the removable end wall 18 carries ion accelerating structure 29, formed at least partially of tungsten or the like, and disposed in spaced-apart relation with respect to the wall of the arc block 22 in which the slot 24 is formed. More specifically, a slit 30 is formed in the ion accelerating structure 29 and arranged in substantial alignment with respect to the slot 24 formed in the wall of the arc block 22. The source of accelerating electrode supply is adapted to be connected between the arc block 22 and the ion accelerating structure 29, the positive and negative terminals of the supply mentioned being respectively connected to the arc block 22 and to the ion accelerating structure 29. Further, the negative terminal of the ion accelerating electrode supply is grounded.

The removable end wall 19 suitably supports an ion collector block 31 formed of stainless steel or the like, and provided with two laterally spaced-apart cavities or pockets 32 and 33 which respectively communicate with aligned slots 34 and 35 formed in the wall of the collector block 31 disposed remote from the removable end wall 19. It is noted that the pockets 32 and 33 are adapted to receive two constituent isotopes of an element which have been separated in the calutron 10, as explained more fully hereinafter. Finally, the collector block 31 is electrically connected to the ion accelerating structure 29. Thus it will be understood that the arc block 22 is connected to the positive ungrounded terminal of the accelerating electrode supply; while the tank 13, the ion accelerating structure 29 and the collector block 31 are connected to the negative grounded terminal of the accelerating electrode supply; the arc block 22 being electrically insulated from the component parts of the tank 13. Thus the portion of the tank 13 disposed between the ion accelerating structure 29 and the collector block 31 constitutes an electrostatic shield for the high-velocity ions tranversing the curved paths between the slit 30 formed in the ion accelerating structure 29 and the slots 34 and 35 formed in the collector block 31, as explained more fully hereinafter.

Considering now the general principle of operation of the calutron 10, a charge comprising a compound of the element to be treated is placed in the charge receptacle 21, the compound of the element mentioned being one which may be readily vaporized. The end walls 18 and 19 are securely attached to the open ends of the tank 13, whereby the tank 13 is hermetically sealed. The various electrical connections are completed and operation of the vacuum pumping apparatus 13a associated with the tank 13 is initiated. When a pressure of the order of $10^{-5}$ to $10^{-4}$ mm. Hg is established within the tank 13, the electric circuits for the windings, not shown, associated with the pole pieces 11 and 12 are closed and adjusted, whereby a predetermined magnetic field is established therebetween traversing the tank 13. The electric circuit for the heater 23 is closed, whereby the charge in the charge receptacle 21 is heated and vaporized. The vapor fills the charge receptacle 21 and is conducted into the communicating cavity formed in the arc block 22. The electric circuit for the filamentary cathode 25 is closed, whereby the filamentary cathode is heated and rendered electron emissive. Then the electric circuit between the filamentary cathode 25 and the anode 26 is closed, whereby an arc discharge is struck therebetween, electrons proceednig from the filamentary cathode 25 through the collimating slot 28 formed in the collimating electrode 27 to the anode 26. The collimating slot 28 formed in the collimating electrode 27 defines the cross section of the stream of electrons proceeding into the arc block 22, whereby the arc discharge has a ribbon-like configuration and breaks up the molecular form of the compound of the vapor to a considerable extent, producing positive ions of the element that is to be enriched with the selected one of its isotopes.

The electric circuit between the arc block 22 and the ion accelerating structure 29 is completed, the ion accelerating structure 29 being at a high negative potential with respect to the arc block 22, whereby the positive ions in the arc block 22 are attracted by the ion accelerating structure 29 and accelerated through the voltage impressed therebetween. More particularly, the positive ions proceed from the cavity formed in the arc block 22 through the slot 24 formed in the wall thereof, and across the space between the ion accelerating structure 29 and the adjacent wall of the arc block 22, and thence through the slit 30 formed in the ion accelerating structure 29. The high-velocity positive ions form a vertical upstanding ribbon or beam proceeding from the cavity formed in the arc block 22 through the slot 24 and the aligned slit 30.

As previously noted, the collector block 31, as well as the tank 13, is electrically connected to the ion accelerating structure 29, whereby there is an electric-field-free path for the high velocity positive ions disposed between the ion accelerating structure 29 and the collector block 31 within the tank 13. The high-velocity positive ions are deflected from their normal straight-line path and from a vertical plane passing through the slot 24 and the aligned slit 30, due to the effect of the relatively strong magnetic field maintained through the space within the tank 13 through which the positive ions travel, whereby the positive ions describe arcs, the radii of which are proportional to the square roots of the masses of the ions and consequently of the isotopes of the element mentioned. Thus, ions of the relatively light isotope of the element describe an interior arc of relatively short radius and are focused through the slot 34 into the pocket 32 formed in the collector block 31; whereas ions of the relatively heavy isotope of the element describe an exterior arc of relatively long radius and are focused through the slot 35 into the pocket 33 formed in the collector block 31. Accordingly, the ions of the relatively light isotope of the element are collected in the pocket 32 and are de-ionized to produce a deposit of the relatively light isotope of the element therein; while the ions of the relatively heavy isotope of the element are collected in the pocket 33 and are de-ionized to produce a deposit of the relatively heavy isotope of the element therein.

After all of the charge in the charge receptacle 21 has been vaporized, all of the electric circuits are interrupted and the end wall 18 is removed so that another charge may be placed in the charge receptacle 21 and subsequently vaporized in the manner explained above. After a suitable number of charges have been vaporized in order to obtain appropriate deposits of the isotope of the element in the pockets 32 and 33 of the collector block 31, the end wall 19 is removed and the deposits of the collected isotopes in the pockets 32 and 33 in the collector block 31 are reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection reference is again made to the prior patent of Ernest O. Lawrence, for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge in the charge receptacle 21 is $UCl_4$, as this compound may be readily vaporized and the molecular form of the vapor may be readily broken up to form positive ions of uranium with great facility. In this case, uranium enriched with $U^{235}$ is collected in the pocket 32 of the collector block 31, and uranium comprising principally $U^{238}$ is collected in the pocket 33 of the collector block 31. Also, it is noted that from a practical standpoint, the deposit of uranium collected in the pocket 32 of the collector block 31 contains considerable amounts of $U^{238}$, in view of the fact that this isotope comprises the dominant constituent of normal uranium. Furthermore, the deposit of uranium collected in the pocket 32 of the collector block 31 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 32 of the collector block 31 is considerably enriched, both with $U^{234}$ and with $U^{235}$, and considerably impoverished with respect to $U^{238}$ as compared to natural or normal uranium.

Referring now more particularly to Figs. 3 to 5, inclusive, of the drawings, there are illustrated the structural details of the ion transmitter unit 20 which is arranged in the magnetic field between the pole pieces of the calutron in the manner previously explained, the transmitter unit 20 comprising the charge receptacle 21 and the arc block 22. The charge receptacle 21 comprises wall structure, including a removable cover 50, defining an upstanding cavity 51 therein, that is adapted to receive a removable charge bottle 52 containing a charge 52 which is to be vaporized. The arc block 22 comprises wall structure defining an upstanding distributing chamber 54 and an upstanding arc chamber 55 therein, the cavity 51 communicating with the distributing chamber 54 through a tubular member 56 supported by the wall structure of the charge receptacle 21 and the wall structure of the arc block 22. The wall structure of the charge receptacle 21 has two upstanding cavities 57 formed therein, in which two elements of the electric heater 23 are arranged. Preferably, each element of the electric heater 23 comprises a coil of resistance wire wound on a supporting insulator, as indicated, whereby each element of the electric heater 23 may be independently placed in and removed from the associated cavity 57. Thus, the charge receptacle 21, and consequently the charge bottle 52, may be appropriately heated in order to vaporize the charge 53 contained in the charge bottle 52. Similarly, the arc block 22 has two upstanding cavities 58 formed therein, in which two electric heating elements 59 are arranged. Preferably, each of the electric heating elements 59 comprises a coil of resistance wire wound on a supporting insulator, as indicated, whereby each of the electric heating elements 59 may be independently placed in and removed from the associated cavity 58. Thus, the arc block 22, and more particularly the distributing chamber 54 therein, may be heated in order to prevent condensation of the contained vapor, as explained more fully hereinafter.

More particularly, the wall structure of the charge receptacle 21 is formed of copper or brass; and the wall structure of the arc block 22 is formed of copper or brass and comprises two primary members 60 and 61. The distributing chamber 54 and the cavities 58 are formed in the member 60; while the arc chamber 55 is formed in the member 61, a series of longitudinally spaced-apart openings 62 being formed in the wall of the member 61 and communicating between the distributing chamber 54 and the arc chamber 55. Also, the arc block 22 comprises a front plate 63 formed of copper or brass and secured to the member 61; the transmitter unit 20 being supported by two rearwardly extending arms 64 which are secured to the member 61 and the front plate 63.

Two upstanding strips 65, formed of tungsten or the like, are secured to the member 61 adjacent the arc chamber 55, thereby to define an upstanding slot therebetween communicating with the arc chamber 55. Also, two upstanding strips 66, formed of tungsten or the like, are secured to the front plate 63 adjacent the strips 65 and spaced a small distance forwardly with respect thereto, thereby to define an upstanding slot between the strips 66 communicating with the arc chamber 55. Thus, the slot defined between the strips 65 and the slot defined between the strips 66 constitute the upstanding slot 24 formed in the front wall of the arc block 22 and communicating with the arc chamber 55.

The filamentary cathode 25 is supported by cathode structure 67 arranged in cooperating relation with respect to the arc block 22, the cathode structure 67 including two terminals 68. The opposite ends of the filamentary cathode 25 are removably clamped in place by the respective terminals 68, and the two terminals are connected to the source of filament supply, as previously noted. The central portion of the filamentary cathode 25 overhangs the central portion of the top wall of the arc block 22; and the collimating electrode 27 is secured to the top wall of the arc block 22, the collimating electrode 27 having the transverse slot 28 formed therein, as previously noted, and communicating with the arc chamber 55. More particularly, the filamentary cathode 25 is spaced a short distance above the collimating electrode 27, the central portion of the filamentary cathode 25 being arranged in alignment with the transverse slot 28 formed in the collimating electrode 27. Also, the anode 26 is secured to the bottom wall of the arc block 22 adjacent the lower end of the arc chamber 55, and in alignment with the central portion of the filamentary cathode 25 and the transverse slot 28 formed in the collimating electrode 27.

The negative and positive terminals of the arc supply are respectively connected to the filamentary cathode 25 and to the arc block 22, the anode 26 and the collimating electrode 27 being connected together by the arc block 22 and consequently to the positive terminal of the arc supply mentioned, as previously noted. Further, the ion accelerating structure 29 comprises two upstanding strips 69 disposed forwardly of the strips 66 and secured to two transversely-extending top and bottom members 70 and 71 to form a unitary structure. The two strips 69 are arranged in transverse spaced-apart relation and carry two electrodes 72, formed of tungsten or the like. The two electrodes 72 are arranged in transverse spaced-apart relation to define the upstanding slit 30 therebetween, and arranged in alignment with the slot 24 formed in the front wall of the arc block 22.

As previously noted, the ion accelerating structure 29, together with the arc block 22, is supported by the removable end wall 18 of the calutron 10, and the positive and negative terminals of the accelerating electrode supply are respectively connected to the arc block 22 and the ion accelerating structure 29. Finally, an upstanding semicircular baffle plate 73, formed of quartz or the like, is arranged in the arc chamber 55, and has a series of longitudinally spaced-apart openings 74 formed therein.

Considering now the detailed operation of the ion transmitter unit 20, when the electric circuit for the heater 23 is completed the charge receptacle 21 and consequently the charge bottle 52 are heated, whereby the charge 53 is vaporized, filling the cavity in the charge bottle 52. The vapor passes through the tubular member 56 into the distributing chamber 54, whereby this chamber is filled with the vapor. The vapor is distributed in the distributing chamber 54 and passes through the openings 62 formed in the wall of the member 61 into the rear part of the arc chamber 55. The vapor then passes through the openings 74 formed in the baffle plate 73, into the front part of the arc chamber 55, whereby this part of the arc chamber 55 is filled with the vapor. More particularly, the arc chamber 55 is thoroughly and substantially uniformly filled with the vapor to be ionized, due to the arrangement of the distributing chamber 54 and the baffle plate 73.

When the circuit for the filamentary cathode 25 is completed, the filamentary cathode is heated and rendered electron emissive; and when the arc supply circuit is completed between the filamentary cathode 25 and the arc block 22, electrons are projected from the central portion of the filamentary cathode 25 toward the collimating electrode 27. More particularly, some of these electrons pass through the transverse slot 28 formed in the collimating electrode 27, into the arc chamber 55, and proceed toward the anode 26. Accordingly, the collimating electrode 27 causes a stream of electrons having a ribbon-like configuration to be projected through the arc chamber 55, whereby the vapor in the arc chamber is ionized. When the accelerating electrode supply circuit is completed, the positive ions produced in the arc chamber 55 are drawn through the upstanding slot 24 formed in the front wall of the arc block 22 by the associated ion accelerating structure 29, to form a beam of positive ions having an upstanding substantially ribbon-like configuration proceeding through the slit 30 between the electrodes 72; which beam of positive ions is projected through the evacuated tank space toward the cooperating collector block 31, in the manner previously explained.

Referring now more particularly to Figs. 6 and 7, there is shown a calutron 1000 embodying the features of the present invention and comprising magnetic field structure including upper and lower pole pieces 1011 and 1012, provided with substantially parallel spaced-apart pole faces, and a tank 1013 disposed between the pole faces of the pole pieces 1011 and 1012. The pole pieces 1011 and 1012 carry windings, not shown, which are adapted to be energized in order to produce a substantially uniform and relatively strong magnetic field therebetween, which magnetic field passes through the tank 1013 and the various parts housed therein. The tank 1013 is as shown of semicylindrical configuration, being substantially semicircular in plan and comprising substantially flat parallel spaced-apart top and bottom walls 1014 and 1015, of semicircular plan, and an upstanding curved rear wall 1016. Upstanding corner stanchions 1017 and 1018 and a central stanchion 1019 are provided adjacent the open front of the tank 1013 to receive a removable face plate 1020 which is secured thereto in removable relation by means of suitable fastening elements, such as the studs 1021. The face plate 1020 is adapted to hermetically seal the tank 1013.

A port 1022 is provided in the tank 1013, communicating with a conduit 1023 carrying a flange 1024 for connection with the flange 1025 of a conduit 1026 which leads to suitable vacuum pumping apparatus, not shown, whereby the interior of the tank may be evacuated to a pressure of the order of $10^{-4}$ to $10^{-5}$ mm. Hg. Preferably, the component parts of the tank 1013 are formed of steel, the top and bottom walls 1014 and 1015 thereof being spaced a short distance from or in contact with the pole faces of the upper and lower pole pieces 1011 and 1012 respectively, the tank 1013 being retained in position in any suitable manner, such as by means of the wooden wedges 1027, whereby the top and bottom walls 1014 and 1015 constitute in effect pole pieces with respect to the interior of the tank 1013.

The face plate 1020 carries a pair of removable panels 1028 and 1029, removably secured thereto in vacuum-tight seal by suitable fastening means such as the studs 1030. The panel 1028 carries a pair of insulating bushings 1031, insulatedly supporting a pair of ion transmitter units 1032.

The ion transmitter units 1032 may each take the form of the ion transmitter units 20 above described, and will include ion generating units 1033 and ion accelerating units 1034. It will be understood that suitable accelerating electrode supply, arc supply, filament supply and heater supply such as illustrated in Fig. 1 is provided for the corresponding elements of each of the ion transmitter units 1032.

The ion accelerating structure 1034 may be supported, as shown in Fig. 7, either from the noninsulating bushing 1035 carried by the removable panel 1028 or alternatively by the noninsulating bushing 1036 carried by the removable face plate 1020. Alternatively, the accelerating structure 1034 may be connected directly to the top and bottom walls 1014 and 1015 of the tank 1013 so as to be grounded thereto and supported independently of the panel 1028 or of the face plate 1020. Furthermore, the accelerating structure 1034 may take the form of an insulated liner mounted in the tank 1013 and adapted to be maintained at a high negative potential, thus permitting the use of a grounded arc block in the transmitter unit 1032, all as more fully set forth in my previously mentioned United States Letters Patent No. 2,709,222.

The removable panel 1029 carries a pair of bushings 1037 and 1038 supporting a pair of ion collector blocks 1039 and 1040, each of which may be constructed in the same manner as the ion collector block 31 above described.

Of course it will be understood that the general principle of operation of the calutron 1000 is the same as that of the calutron 10; each transmitter transmits an ion beam to the associated receiver; the respective lighter and heavier isotopes of the element treated are disposed adjacent the inner and outer boundaries of the ion beam adjacent the receiver, whereby the respective lighter and heavier isotopes of the element treated are respectively collected in the two pockets of the associated receiver; all in the manner previously explained.

It will be noted that the normal operation of the calutron 1000 presents instances when it becomes desirable to remove the ion generator and transmitter without disturbing the other elements of the assembly, which is conveniently accomplished by simply removing the panel 1028. Again occasions may arise when the removal of the receiver units only from the tank is desired, which may be achieved conveniently by simply removing the panel 1029. On initial installation, however, when the ion generator and transmitter are being initially aligned in their proper positions to permit focusing of the transmitted beams at the proper points with respect to the receiver, it becomes desirable to remove the face plate 1020 and assemble the entire unit together. Furthermore, it may become desirable to clean off the entire unit of a deposit of un-ionized condensations of the charge material, in which case it is convenient to remove the entire face plate assembly to permit such cleaning without disturbing the relative alignment of the component parts.

Figure 8:
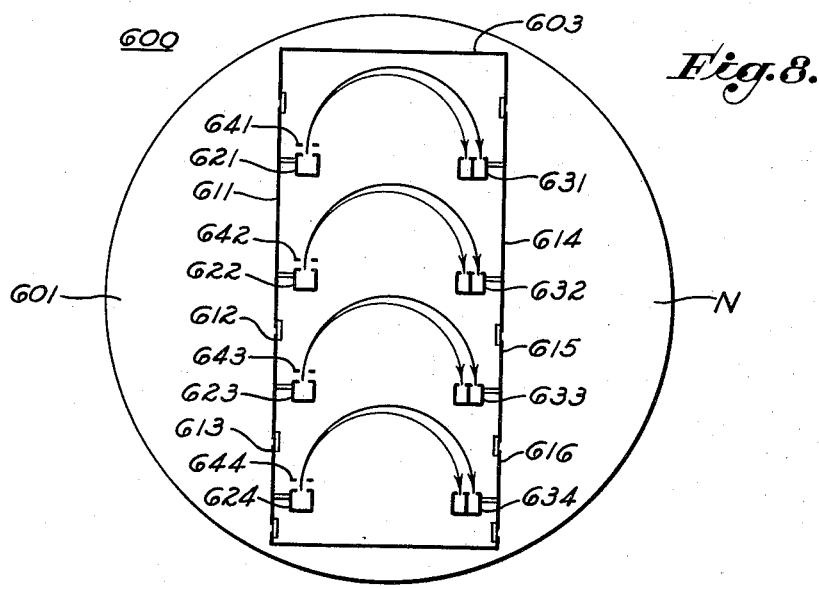
Figs. 8 and 9 are diagrammatic illustrations of two forms of calutrons embodying features of the present invention and in which the ion beams are arranged in nonintersecting relation in a single plane.

Referring now more particularly to Fig. 8, there is illustrated a calutron 600 embodying the features of the present invention and comprising a number of transmitters, of the general construction and arrangement of the transmitter 20, and magnetic field structure, the north pole of which is indicated at 601. Also, the calutron 600 comprises an evacuated tank 603, substantially rectangular in plan, including wall structure provided with a number of removable panels 611 to 616, inclusive, supporting the transmitters 621 to 624, inclusive, and a number of receivers 631 to 634, inclusive. Specifically, the removable panel 611 supports the two transmitters 621 and 622, while the removable panels 612 and 613 respectively support the transmitters 623 and 624. Similarly, the removable panel 614 supports the two receivers 631 and 632, while the removable panels 615 and 616 respectively support the receivers 633 and 634. Of course it will be understood that the panel arrangement may be appropriately varied, whereby any removable panel may support one or any desired number of transmitters or receivers, the panel arrangement specified being merely illustrative.

In the calutron 600, the four transmitters 621 to 624, inclusive, comprise ion generators and individually associated ion accelerating structures 641 to 644, inclusive, and are individually paired with the four receivers 631 to 634, inclusive, whereby four ion beams are transmitted through the evacuated tank space from the four transmitters to the four receivers. Each of the four ion beams is arcuate-shaped, being substantially semi-circular, the ions traveling in a clockwise direction, due to the disposition of the magnetic field, the north magnetic pole 601 being disposed below the tank 603; also, each of the four ion beams is disposed substantially transversely of the longitudinal axis of the magnetic field. Also, the transmitters 621 to 624, inclusive, are arranged in a linear array, the receivers 631 to 634, inclusive, are arranged in a linear array; whereby both the transmitters and the receivers are arranged in regular arrays, resulting in the formation of a substantially regular pattern of the four ion beams in the tank 603. More specifically, the four ion beams in the tank 603 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. While the calutron 600 is illustrated for purposes of explanation as comprising four transmitter-receiver pairs, the actual number of transmitter-receiver pairs is limited only by physical considerations.

Of course it will be understood that the general principle of operation of the calutron 600 is the same as that of the calutron 10; each transmitter transmits an ion beam to the associated receiver; the respective lighter and heavier isotopes of the element treated are disposed adjacent the inner and outer boundaries of the ion beam adjacent the receiver, whereby the respective lighter and heavier isotopes of the element treated are respectively collected in the two pockets of the associated receiver; all in the manner previously explained. Thus it will be understood that in the calutron 600, the evacuated space in the tank 603 is utilized very economically, in that the volume thereof is only somewhat greater than the volume of the tank of the single-beam calutron 10, although four ion beams instead of one are disposed therein. Accordingly, the calutron 600 has an isotope separating capacity of the order of four times that of the single-beam calutron 10, although it is only of somewhat larger dimensions and requires only slightly larger associated vacuum pumping apparatus.

Moreover, in the calutron 600 the panel arrangement permits ready removal of any one of the panels 611, 614, etc., from the wall of the tank 603, whereby a blank panel may be inserted in its place and the calutron operated with a corresponding reduction in the number of ion beams, in an obvious manner. This arrangement permits operation of the calutron 600 with a reduced number of ion beams, with one or more of the panels removed, when it is necessary to adjust or repair the supported transmitter or receiver.

Figure 9:
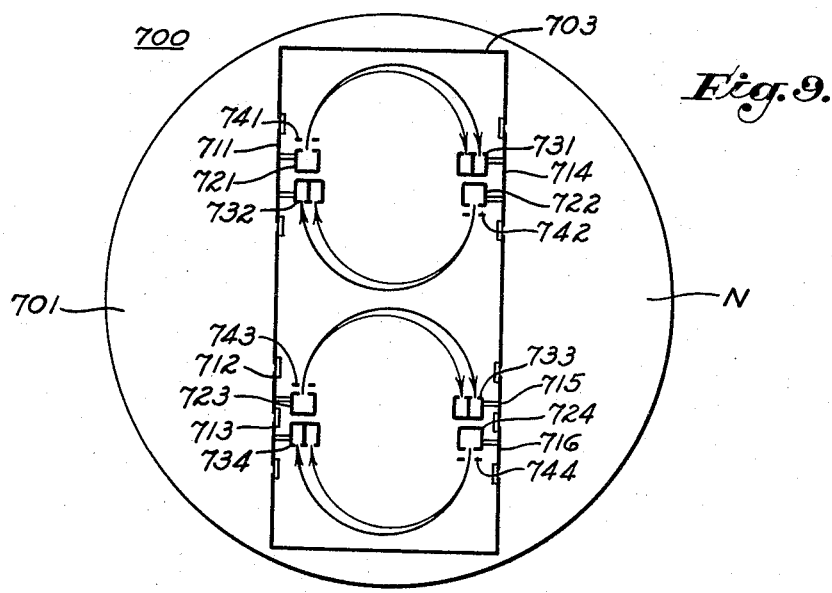

Referring now more particularly to Fig. 9, there is illustrated a calutron 700 embodying the features of the present invention and comprising a number of transmitters, of the general construction and arrangement of the transmitter 20, and magnetic field structure, the north-pole of which is indicated at 701. Also, the calutron 700 comprises an evacuated tank 703, substantially rectangular in plan, including wall structure provided with a number of removable panels 711 to 716, inclusive, supporting the transmitters 721 to 724, inclusive, and a number of receivers 731 to 734, inclusive. Specifically, the removable panel 711 supports the transmitter 721 and the receiver 732, while the removable panels 712 and 713 respectively support the transmitter 723 and the receiver 734. Similarly, the removable panel 714 supports the receiver 731 and the transmitter 722, while the removable panels 715 and 716 respectively support the receiver 733 and the transmitter 724. Of course it will be understood that the panel arrangement may be appropriately varied, whereby any removable panel may support one or any desired number of transmitters or receivers, the panel arrangement specified being merely illustrative.

In the calutron 700, the four transmitters 721 to 724, inclusive, comprise ion generators and individually associated ion accelerating structures 741 to 744, inclusive, and are individually paired with the four receivers 731 to 734, inclusive, whereby four ion beams are transmitted through the evacuated tank space from the four transmitters to the four receivers. Each of the four ion beams is arcuate-shaped, being substantially semicircular, the ions traveling in a clockwise direction, due to the disposition of the magnetic field, the north magnetic pole 701 being disposed below the tank 703; also, each of the four ion beams is disposed substantially transversely of the longitudinal axis of the magnetic field. Also, the transmitters 721 and 723 and the receivers 732 and 734 are arranged in a linear array; the transmitters 722 and 724 and the receivers 731 and 733 are arranged in a linear array; whereby both the transmitters and the receivers are arranged in regular arrays, resulting in the formation of a substantially regular pattern of the four ion beams in the tank 703. More specifically, the four ion beams in the tank 703 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. While the calutron 700 is illustrated for purposes of explanation as comprising four transmitter-receiver pairs, the actual number of transmitter-receiver pairs is limited only by physical considerations.

In view of the foregoing, it will be understood that the general construction and arrangement of the calutron 700 is quite similar to that of the calutron 600, that it embodies the same structural advantages, and that the principle of operation is substantially identical.

In the calutrons 600 and 700, respectively shown in Figs. 8 and 9, the various transmitter-receiver pairs are illustrated as being arranged along a single plane normal to the axis of the magnetic field, although it will be understood that they may be disposed along a number of longitudinally spaced-apart parallel planes normal to the axis mentioned. This alternative disposition of the transmitter-receiver pairs will be readily understood from an examination of the calutron 900, illustrated in Figs. 10 to 12, inclusive, and the calutron 1200, illustrated in Figs. 13 to 15, inclusive. More particularly, the calutrons 900 and 1200 respectively correspond to the calutrons 600 and 700, wherein the transmitter-receiver pairs are arranged along two longitudinally spaced-apart planes normal to the axis of the magnetic field, as is more fully explained hereinafter.

Referring now more particularly to Figs. 10 to 12, inclusive, there is illustrated the calutron 900 embodying the features of the present invention and comprising a number of transmitters, of the general construction and arrangement of the transmitter illustrated in Figs. 1 to 4, and magnetic field structure including north and south poles 901 and 902, respectively, and an evacuated tank 903 arranged between the poles mentioned. The tank 903 is substantially rectangular in plan and includes wall structure provided with a number of removable panels 911 to 916, inclusive, supporting the transmitters 921 to 924, inclusive, and a number of receivers 931 to 934, inclusive. Specifically, the removable panel 911 supports the two transmitters 921 and 922, while the removable panels 912 and 913 respectively support the transmitters 923 and 924. Similarly, the removable panel 914 supports the two receivers 931 and 932, while the removable panels 915 and 916 respectively support the receivers 933 and 934. Of course it will be understood that the panel arrangement may be appropriately varied, whereby any removable panel may support one or any desired number of transmitters or receivers, the panel arrangement specified being merely illustrative.

In the calutron 900, the four transmitters 921 to 924, inclusive, comprise ion generators and individually associated ion accelerating structures 941 to 944, inclusive, and are individually paired with the four receivers 931 to 934, inclusive, whereby four ion beams are transmitted through the evacuated tank space from the four transmitters to the four receivers. Each of the four ion beams is arcuate-shaped, being substantially semicircular, the ions traveling in a clockwise direction, due to the disposition of the magnetic field, the north magnetic pole 901 being disposed below the tank 903; also, each of the four ion beams is disposed substantially transversely of the longitudinal axis of the magnetic field. Also, the transmitters 921 and 923 and the transmitters 922 and 924 are arranged in parallel linear arrays; the receivers 931 and 933 and the receivers 932 and 934 are arranged in parallel linear arrays; whereby both the transmitters and the receivers are arranged in regular arrays, resulting in the formation of a substantially regular pattern of the four ion beams in the tank 903. More specifically, the transmitter-receiver pairs 921—931 and 923—933 are arranged along an upper plane substantially normal to the axis of the magnetic field; while the transmitter-receiver pairs 922—932 and 924—934 are arranged along a lower plane substantially normal to the axis mentioned. Accordingly, the two upper ion beams transmitted by the transmitters 921 and 923 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. Similarly, the two lower ion beams transmitted by the transmitters 922 and 924 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. The two vertical planes of approximate symmetry are coincident; and the two horizontal planes of symmetry along which the two pairs of ion beams are disposed are arranged in longitudinally spaced-apart parallel relation substantially normal to the axis of the magnetic field. While the calutron 900 is illustrated for purposes of explanation as comprising four transmitter-receiver pairs arranged along two longitudinally spaced-apart parallel planes, the actual number of transmitter-receiver pairs, as well as the number of longitudinally spaced-apart parallel planes along which they are arranged, is limited only by physical considerations.

In view of the foregoing, it will be understood that the general construction and arrangement of the calutron 900 is quite similar to that of the calutron 600, that it embodies at least the same structural advantages, and that the principle of operation is substantially identical.

Referring now more particularly to Figs. 13 to 15, inclusive, there is illustrated the calutron 1200 embodying the features of the present invention and comprising a number of transmitters of the general construction and arrangement of the transmitter illustrated in Figs. 1 to 4, and magnetic field structure including north and south poles 1201 and 1202, respectively, and an evacuated tank 1203 arranged between the poles mentioned. The tank 1203 is substantially rectangular in plan and includes wall structure provided with a number of removable panels 1211 to 1216, inclusive, supporting the transmitters 1221 to 1224, inclusive, and a number of receivers 1231 to 1234, inclusive. Specifically, the removable panel 1211 supports the transmitter 1221 and the receiver 1232, while the removable panels 1212 and 1213 respectively support the transmitter 1223 and the receiver 1234. Similarly, the removable panel 1214 supports the receiver 1231 and the transmitter 1222, while the removable panels 1215 and 1216 respectively support the receiver 1233 and the transmitter 1224. Of course it will be understood that the panel arrangement may be appropriately varied, whereby any removable panel may support one or any desired number of transmitters or receivers, the panel arrangement specified being merely illustrative.

In the calutron 1200, the four transmitters 1221 to 1224, inclusive, comprise ion generators and individually associated ion accelerating structures 1241 to 1244, inclusive, and are individually paired with the four receivers 1231 to 1234, inclusive, whereby four ion beams are transmitted through the evacuated tank space from the four transmitters to the four receivers. Each of the four ion beams is arcuate-shaped, being substantially semicircular, the ions traveling in a clockwise direction, due to the disposition of the magnetic field, the north magnetic pole 1201 being disposed below the tank 1203; also, each of the four ion beams is disposed substantially transversely of the longitudinal axis of the magnetic field. Also, the transmitters 1221 and 1223 and the receivers 1232 and 1234 are arranged in parallel linear arrays; the transmitters 1222 and 1224 and the receivers 1231 and 1233 are arranged in parallel linear arrays; whereby both the transmitters and the receivers are arranged in regular arrays, resulting in the formation of a substantially regular pattern of the four ion beams in the tank 1203. More specifically, the transmitter-receiver pairs 1222—1232 and 1224—1234 are arranged along an upper plane substantially normal to the axis of the magnetic field; while the transmitter-receiver pairs 1221—1231 and 1223—1233 are arranged along a lower plane substantially normal to the axis mentioned. Accordingly, the two upper ion beams transmitted by the transmitters 1222 and 1224 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. Similarly, the two lower ion beams transmitted by the transmitters 1221 and 1223 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. The two vertical planes of approximate symmetry are coincident; and the two horizontal planes of symmetry along which the two pairs of ion beams are disposed are arranged in longitudinally spaced-apart parallel relation substantially normal to the axis of the magnetic field. While the calutron 1200 is illustrated for purposes of explanation as comprising four transmitter-receiver pairs arranged along two longitudinally spaced-apart parallel planes, the actual number of transmitter-receiver pairs, as well as the number of longitudinally spaced-apart parallel planes along which they are arranged, is limited only by physical considerations.

In view of the foregoing, it will be understood that the general construction and arrangement of the calutron 1200 is quite similar to that of the calutron 700, that it embodies at least the same structural advantages, and that the principle of operation is substantially identical.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A calutron comprising a substantially fluid-tight tank including wall structure provided with at least one removable panel, means for evacuating said tank, means for establishing a magnetic field along a given axis through said tank, a plurality of ion beam transmitters disposed in said tank and secured to said panel, whereby said transmitters and said panel are removable as a unit from said tank, each of said ion beam transmitters including means for generating ions of a polyisotopic material and means for projecting therefrom an ion beam substantially transversely of said given axis, whereby the ions of different isotopes of the material in each of said ion beams are subjected to a segregating influence, and a plurality of ion beam receivers disposed in said tank, each of said ion beam receivers including means for receiving one of said ion beams and for collecting a predetermined portion thereof containing a given isotope of the material.

2. A calutron comprising a substantially fluid-tight tank including wall structure provided with at least one removable panel, means for evacuating said tank, means for establishing a magnetic field along a given axis through said tank, a plurality of ion beam transmitters disposed in said tank, each of said ion beam transmitters including means for generating ions of a polyisotopic material and means for projecting therefrom an ion beam substantially transversely of said given axis, whereby the ions of different isotopes of the material in each of said ion beams are subjected to a segregating influence, and a plurality of ion beam receivers disposed in said tank and secured to said panel, whereby said ion beam receivers and said panel are removable as a unit from said tank, each of said ion beam receivers including means for receiving one of said ion beams and for collecting a predetermined portion thereof containing a given isotope of the material.

3. A calutron comprising a substantially fluid-tight tank including wall structure provided with at least one removable panel, means for evacuating said tank, means for establishing a magnetic field along a given axis through said tank, a plurality of ion beam transmitters disposed in said tank, each of said ion beam transmitters including means for generating ions of a polyisotopic material and means for projecting therefrom an ion beam substantially transversely of said given axis, whereby the ions of different isotopes of the material in each of said ion beams are subjected to a segregating influence, a plurality of ion beam receivers disposed in said tank, each of said ion beam receivers including means for receiving one of said ion beams and for collecting a predetermined portion thereof containing a given isotope of the material, and means for securing at least one of said ion beam transmitters and one of said ion beam receivers to said panel, whereby said last-mentioned one ion beam transmitter and said last-mentioned one ion beam receiver and said panel are removable as a unit from said tank.

4. A calutron comprising a substantially fluid-tight tank including wall structure provided with at least one removable panel, means for evacuating said tank, means for establishing a magnetic field along a given axis through said tank, ion transmitting means disposed in said tank, said ion transmitting means including means for generating ions of a polyisotopic material and means for projecting therefrom an ion beam substantially transversely of said given axis, whereby the ions of different isotopes of the material are subjected to a segregating influence, ion receiving means disposed in said tank, said ion receiving means including means for receiving said ion beam and for collecting a predetermined portion thereof containing a given isotope of the material, and means for securing said ion transmitting means and said ion receiving means to said panel, whereby said ion transmitting means and said ion receiving means and said panel are removable as a unit from said tank.

5. A calutron comprising a substantially fluid-tight tank including wall structure provided with at least one removable panel, means for evacuating said tank, means for establishing a magnetic field along a given axis through said tank, ion transmitting means disposed in said tank, said ion transmitting means including a generator operative to produce ions of a polyisotopic material and means for projecting therefrom an ion beam substantially transversely of said given axis, whereby the ions of different isotopes are subjected to a segregating influence, ion receiving means disposed in said tank, said ion receiving means including means for receiving said ion beam and for collecting a predetermined portion thereof containing a given isotope of the material, and means for securing said ion generator and said ion receiving means to said panel, whereby said ion generating means and said ion receiving means and said panel are removable as a unit from said tank.

6. In a calutron, a tank including supporting structure and a removable wall carried by said supporting structure and a removable panel carried by said wall, means for evacuating said tank, means for establishing a magnetic field along a given axis through said tank, an ion beam transmitter disposed in said tank and carried by said panel, said ion beam transmitter including means for generating ions of a polyisotopic material and means for projecting therefrom an ion beam substantially transversely of said given axis, whereby the ions of different isotopes of the material are subjected to a segregating influence, an ion beam receiver disposed in said tank, said ion beam receiver including means for receiving said ion beam and means for collecting a predetermined portion thereof containing a given isotope of the material, said wall and said panel and said ion beam transmitter being removable as a unit from said supporting structure, said panel and said ion beam transmitter being removable as a unit from said wall.

7. In a calutron, a tank including supporting structure and a removable wall carried by said supporting structure and a removable panel carried by said wall, means for evacuating said tank, means for establishing a magnetic field along a given axis through said tank, an ion beam transmitter disposed in said tank, said ion beam transmitter including means for generating ions of a polyisotopic material and means for projecting therefrom an ion beam substantially transversely of said given axis, whereby the ions of different isotopes of the material are subjected to a segregating influence, an ion beam receiver disposed in said tank and carried by said panel, said ion beam receiver including means for receiving said ion beam and means for collecting a predetermined portion thereof containing a given isotope of the material, said wall and said panel and said ion beam receiver being removable as a unit from said supporting structure, said panel and said ion beam receiver being removable as a unit from said wall.

8. In a calutron, a tank including supporting structure and a removable wall carried by said supporting structure and first and second removable panels carried by said wall, means for evacuating said tank, means for establishing a magnetic field along a given axis through said tank, an ion beam transmitter disposed in said tank and carried by said first panel, said ion beam transmitter including means for generating ions of a polyisotopic material and means for projecting therefrom an ion beam substantially transversely of said given axis, whereby the ions of different isotopes of the material are subjected to a segregating influence, an ion beam receiver disposed in said tank and carried by said second panel, said ion beam receiver including means for receiving said ion beam and means for collecting a predetermined portion thereof containing a given isotope of the material, said wall and said first and second panels and said ion beam transmitter and said ion beam receiver being removable as a unit from said supporting structure, said first panel and said ion beam transmitter being removable as a unit from said wall and said second panel and said ion beam receiver being removable as a unit from said wall.

No references cited.